Patented Aug. 22, 1939

2,170,185

UNITED STATES PATENT OFFICE 2,170,185

MENTHYL ANTHRANILATE AND PROCESS OF PREPARING SAME

Marion Scott Carpenter, Nutley, N. J., assignor to Givaudan-Delawanna, Inc., New York, N. Y., a corporation of New York No Drawing. Application April 1, 1936, Serial No. 72,144

7 Claims. (Cl. 167—90)

This invention relates to a new compound which I have discovered and found to possess unique and valuable properties which render it of great value to the cosmetic and allied industries, namely menthyl anthranilate which is the menthyl ester of anthranilic acid.

I have found that when this new substance is incorporated in cosmetic preparations of the type known in the trade as "sun tan cream" or "sunburn lotion", these preparations have an absorptive capacity for the actinic rays of sunlight at least three times as great as similar preparations having as their absorptive base such compounds as, for example, the menthyl ester of salicylic acid. The new substance is further characterized by low toxicity and absence of irritation when applied to the epidermis. These latter properties are the more enhanced by virtue of the circumstance that it is necessary to use only one-third as much of the new substance in order to obtain the protection equivalent to other preparations using weaker absorptive bases. In addition, my product has a definite healing action. Menthyl anthranilate is a colorless or pale yellow oil having a distinct bluish fluorescence. It is somewhat viscous at room temperature. It has a boiling point of 177-179° C. under a vacuum of 3 mm. of mercury and has a specific gravity at 35° of about 1.037. It is readily soluble in the common organic solvents, as well as in essential oils and the fats and waxes commonly used in the arts. It is unusually resistant to hydrolysis—9 hours refluxing with N/2 alcoholic potash are necessary for 100% saponification. At ordinary temperatures this ester is practically odorless, but the heated vapor has a faint odor reminiscent of the anthranilates of the lower aliphatic alcohols. The high boiling point, stability in the presence of alkali and lack of appreciable odor make the new compound an invaluable fixative for perfumes, especially for use in soaps. Depending upon whether the ester is prepared from optically active or inactive menthol, it shows a corresponding presence or absence of optical activity, without any appreciable variation in any of its other physical properties, or in its potency for absorption of actinic rays.

I have found that my new compound can be prepared by the classic methods for esterification as, for example, the interaction of menthol, anthranilic acid and a dehydrating catalyst such as sulfuric acid or p-toluene sulfonic acid. However, because of the low velocity of esterification and of the ease with which menthol, as a secondary alcohol, becomes dehydrated to menthene, the yields of ester are negligible by such methods. The reaction of menthyl halides with an alkaline salt of anthranilic acid affords better yields, but menthyl halides are troublesome and costly to prepare. For these reasons, I prefer to operate by a different method without, however, intending to limit myself to this, or any other, mode of preparation. An example of the preferred synthesis is as follows:

2 grams of sodium metal are dissolved in 25 grams anhydrous methanol. To the resulting solution are added 390 grams menthol, either natural or synthetic. The methanol is then distilled off. 250 grams methyl anthranilate are added and distillation resumed in a partial vacuum under conditions of temperature and pressure such that only methanol distills off. When all methanol has been removed the temperature and vacuum are increased. There distills over first a mixture of the excess menthol with a small amount of unchanged methyl anthranilate, which after analysis can be used in the next batch. The temperature then rises rapidly and there are collected about 300 grams of good menthyl anthranilate. The still residue contains sodium mentholate which can either be discarded or used anew in place of preparing the substance from sodium metal and menthol as detailed above.

To those skilled in the art many modifications of the above process suggest themselves, including the use of other alkali metals such as potassium or calcium in place of sodium, other solvent media and other esters of anthranilic acid as starting materials, all of which would come within the scope of the present invention. For example, other alcohols may be used as solvent media, but when methyl anthranilate is employed in the process it is best to use methyl alcohol as a solvent in order to avoid the difficulty of recovering a mixture of two different alcohols. If other alcohols are used, such alcohols must be distilled off with the methanol from the methyl anthranilate. Likewise other esters of anthranilic acid, such as ethyl anthranilate, butyl anthranilate, etc., can be used so long as the esters and the alcohol contained therein have a lower boiling point than the menthyl anthranilate or menthol.

The invention claimed is:

1. Process of preparing menthyl anthranilate which comprises reacting a menthol solution of an alkali metal mentholate with an ester of anthranilic acid having a boiling point lower than that of menthyl anthranilate or menthol.

2. Process of preparing menthyl anthranilate which comprises reacting a menthol solution of an alkali metal mentholate with an ester of anthranilic acid having a boiling point lower than that of menthyl anthranilate or menthol, and distilling off the menthyl anthranilate.

3. Process of preparing menthyl anthranilate which comprises reacting a menthol solution of sodium mentholate with methyl anthranilate and distilling off the menthyl anthranilate.

4. Process of preparing menthyl anthranilate which comprises making a menthol solution of sodium mentholate, adding thereto an ester of anthranilic acid having a boiling point lower than that of menthyl anthranilate or menthol and distilling off the menthyl anthranilate under reduced pressure.

5. Process of preparing menthyl anthranilate which comprises reacting sodium alcoholate with menthol, heating said solution and adding methyl anthranilate thereto, heating the mixture at reduced pressure and at a temperature to distill off the methanol and the alcohol from the alcoholate, then increasing the temperature and distilling off and collecting the menthyl anthranilate.

6. Process of preparing menthyl anthranilate which comprises reacting sodium and menthol with anhydrous methanol, heating said solution and adding methyl anthranilate thereto, heating the mixture at reduced pressure and at a temperature to distill off the methanol, then increasing the temperature and distilling off and collecting the menthyl anthranilate.

7. A cosmetic preparation comprising a composition containing the menthyl ester of anthranilic acid.

MARION SCOTT CARPENTER.